United States Patent [19]

Mardirossian

[11] Patent Number: 5,796,338
[45] Date of Patent: Aug. 18, 1998

[54] SYSTEM FOR PREVENTING LOSS OF CELLULAR PHONE OR THE LIKE

[75] Inventor: Aris Mardirossian, Germantown, Md.

[73] Assignee: Aris Mardirossian, Inc., Gaithersburg, Md.

[21] Appl. No.: 794,636

[22] Filed: Feb. 3, 1997

[51] Int. Cl.$^6$ ..................... G08B 13/14
[52] U.S. Cl. ............ 340/568; 340/571; 340/539; 340/693; 340/325.44; 455/89; 455/134
[58] Field of Search ............ 340/568, 571, 340/572, 539, 693, 825.36, 825.44, 825.49, 531, 573; 455/89, 90, 134, 404, 426, 31.3; 379/37, 38, 39

[56] References Cited

U.S. PATENT DOCUMENTS

| | | | |
|---|---|---|---|
| 4,481,382 | 11/1984 | Villa-Real | 455/556 |
| 4,675,656 | 6/1987 | Narcisse | 340/539 |
| 4,777,478 | 10/1988 | Hirsch et al. | 340/573 |
| 4,845,485 | 7/1989 | Pace | 340/825.44 |
| 5,086,290 | 2/1992 | Murray et al. | 340/539 |
| 5,220,366 | 6/1993 | King | 354/76 |
| 5,223,815 | 6/1993 | Rosenthal et al. | 340/539 |
| 5,255,306 | 10/1993 | Melton et al. | 379/38 |
| 5,349,329 | 9/1994 | Smith | 340/539 |
| 5,396,218 | 3/1995 | Olah | 340/572 |
| 5,455,560 | 10/1995 | Owen | 340/539 |
| 5,502,989 | 4/1996 | Murray, Jr. et al. | 70/58 |
| 5,504,474 | 4/1996 | Libman et al. | 340/572 |
| 5,530,426 | 6/1996 | Wilk | 340/531 |
| 5,576,692 | 11/1996 | Tompkins et al. | 340/571 |
| 5,635,897 | 6/1997 | Kuo | 340/311.1 |
| 5,652,564 | 7/1997 | Winbush | 340/426 |

Primary Examiner—Thomas J. Mullen, Jr.
Assistant Examiner—Benjamin C. Lee
Attorney, Agent, or Firm—Joseph A. Rhoa

[57] ABSTRACT

A system and method for reducing the risk of cellular phone loss, misplacement, and/or theft, the system including a wireless transmitter in a cell phone for intermittently sending security signals to a device (e.g. pager) to be worn by a user. The device includes an alarm which is actuated when either the strength or amplitude of the security signal(s) falls below a predetermined threshold or when such security signals are not received by the device (e.g. pager) for a predetermined period of time. Accordingly, the user is alerted to potential loss, misplacement, and/or theft of the cell phone.

7 Claims, 3 Drawing Sheets

SYSTEM FOR PREVENTING LOSS OF CELLULAR PHONE OR THE LIKE

This invention relates to a security system for preventing a loss or misplacement of a cellular phone or the like. More particularly, this invention relates to such a system including a transmitter built into the cell phone which communicates with a receiver to be worn by a user, wherein the receiver sounds an alarm or an alerting signal in response to either receiving a signal(s) from the phone having an amplitude or power level below a predetermined threshold or to not receiving an appropriate signal from the cell phone transmitter for a predetermined period of time.

BACKGROUND OF THE INVENTION

It has been found that portable cellular telephones are subject to loss by their respective owners due to the fact that they are cordless, small, and easy to misplace or forget. Thus, a need exists in the art for a system for preventing such loss or misplacement, as well as theft.

U.S. Pat. No. 5,396,218 discloses a portable security system based upon maintaining wireless communication between two or more plastic cards within a defined range. In the simplest form, a first card of the '218 patent intermittently transmits an identification code to a second card. The second card compares that transmitted code with a code stored in an internal register, and upon matching those codes, transmits a return code to the first card. The first card compares the return code with a code in an internal register, and upon matching those codes, resets a timer. If the timer is not reset during a defined number of transmissions by the first card, an alarm is activated. One card may be attached to a valuable object, such as a wallet, while the other is placed elsewhere on the person. Accordingly, theft of the object will result in activation of the alarm circuit. Unfortunately, the cards of the '218 patent are burdensome in that they are conspicuous, and must physically be attached by the operator to the valuable possession and the operator's body. For example, if one wished to protect his wallet from theft or loss, the user must first purchase the cards, then place one card in his wallet (if it fits) and thereafter, for example, place the second card in his pocket each and every day in different pairs of pants. This is burdensome.

U.S. Pat. No. 5,530,426 discloses a system and associated method for protecting valuable personal possessions including a wireless transmitter disposed in a first housing and a corresponding receiver disposed in a second housing. One of the housings may be attached to an earring, while the other is attached to the person of the user. A detector is connected to the receiver to monitor the distance between the first and second housings, and an alarm signal generator generates an alarm when the distance between the first and second housings surpasses a predetermined maximum threshold. Unfortunately, the system of the '426 patent suffers from the same problems as those discussed above with regard to the '218 patent. For example, each time the user wishes to change earrings, the user must take one of the housings off of the previously worn earrings and transfer same to the pair to be worn. Secondly, in addition to remembering his wallet/pager, car keys, etc., the user must each and every morning remember to put the other burdensome housing in his pocket or the like. As stated above, the systems and procedures associated with the '426 patent are burdensome, inefficient, and undesirable.

In view of the above, it is clear that there exists a need in the art for a system and corresponding method for preventing loss, misplacement, or theft of cell phones, that is less burdensome, less expensive and more efficient than prior art systems for preventing loss of valuable possessions.

It is the purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a system for reducing the risk of loss or theft of a cellular telephone, the system comprising:

a cellular telephone including: (a) a cell phone battery; (b) a wireless cell phone transmitter for voice and DTMF communication with distant phones, pagers, and/or computers via a cellular telephone network; (c) a demodulator for demodulating incoming voice signals; and (d) a security wireless transmitter for sending wireless security signals to a device to be worn or carried by the user (e.g. pager), the cell phone battery supplying power to each of the cell phone transmitter, the demodulator, and the security transmitter;

the device to be worn or carried by the user including a battery, an alarm, a security controller, and a first wireless receiver for receiving the wireless security signals sent from the security transmitter of the cellular telephone, the battery in the device to be worn or carried by the user supplying power to the security controller, the alarm, and the first receiver;

wherein the security controller and the device to be worn or carried by the user includes means for actuating the alarm in response to one of: (i) the wireless security signal received by the first receiver from the cell phone being of a strength or amplitude below or equal to a, predetermined threshold; and (ii) no wireless security signal above the predetermined threshold being received by the first receiver from the cell phone for a predetermined period of time, whereby the user is alerted to cell phone misplacement, loss, or theft by actuation of the alarm.

According to certain preferred embodiments of this invention, the device to be worn or carried by the user includes a pager for receiving wireless paging message signals from a telephone system indicative of a calling party's number or the like, said pager including a second wireless paging receiver for receiving paging message signals and a display for displaying data relating to the received paging messages and relating to the alarm being actuated in response to potential loss, misplacement, or theft of the cell phone.

This invention will now be described with respect to certain embodiments thereof, accompanied by certain illustrations, wherein:

IN THE DRAWINGS

DETAILED DESCRIPTION OF CERTAIN EMBODIMENTS OF THIS INVENTION

Figure 1:
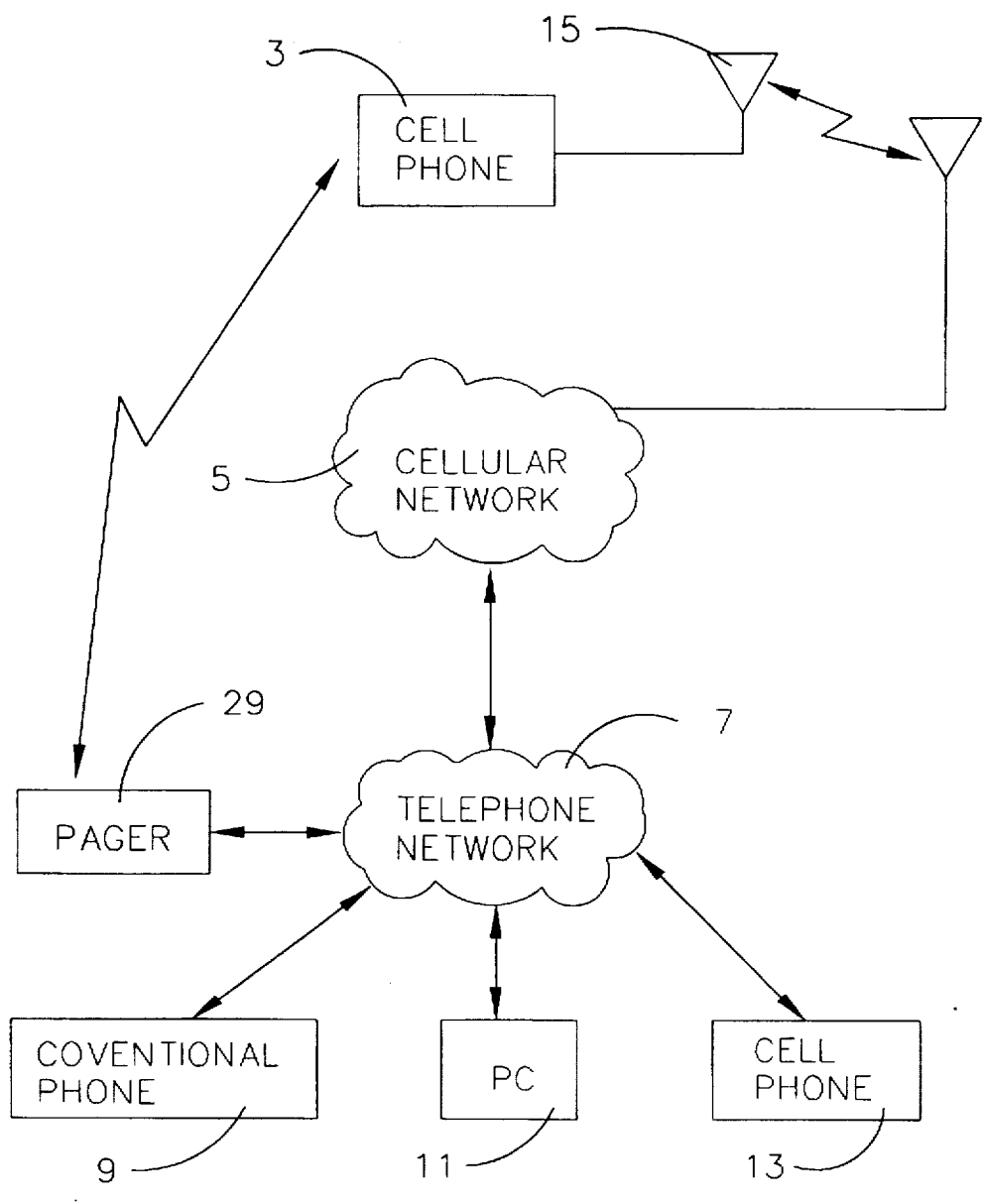
FIG. 1 is a block diagram of a cell phone and pager system according to an embodiment of this invention.

Referring now more particularly to the accompanying drawings in which like reference numerals indicate like parts throughout the several views.

FIG. 1 is a block diagram illustrating a cell phone and pager system in accordance with an embodiment of this invention. The system including cell phone 3, cellular telephone network 5, conventional telephone network 7 such as the PSTN, conventional phones 9, personal computers (PCs) 11, pager 29, and other cell phones 13. Cell phone 3 may voice or DTMF communicate with any one of devices 9, 11, 13, and 29 by way of conventional digital or analog cell phone transmitters/receiver 15 which may communicate with cellular network 5 in a conventional wireless manner. From network 5, the transmitted signals from phone 3 may traverse PSTN 7 and make contact with any one of conventional telephones 9, personal computers 11, pager(s) 29, and/or cellular phones 13. Furthermore, the phone 3 and pager 29 have additional security transmitter/receiver means for communicating with one another proximate the user without the need for networks 5 and 7, which will be discussed in detail below relative to FIGS. 2–3.

Figure 2:
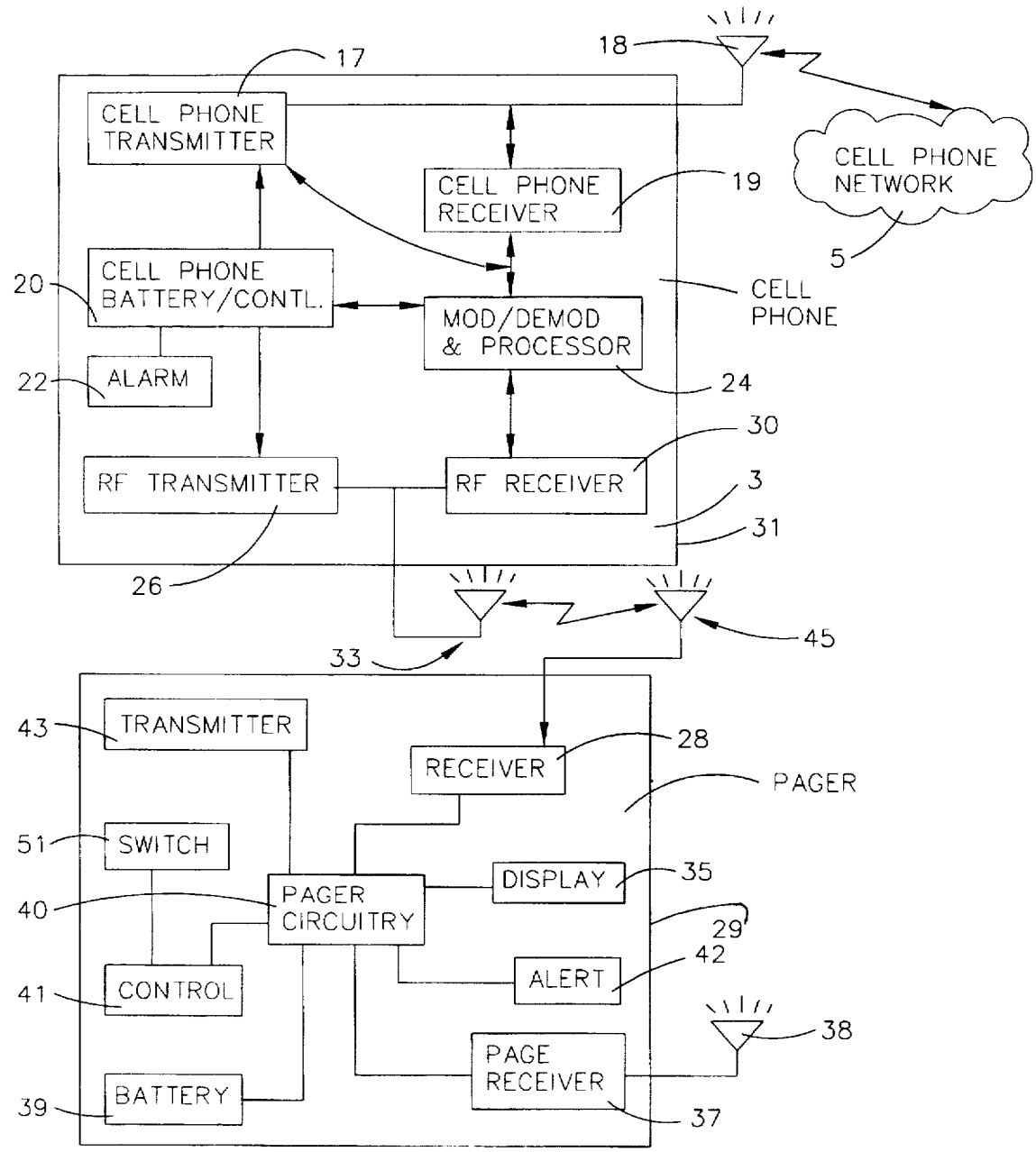
FIG. 2 is a schematic/block diagram of a system according to an embodiment of this invention for preventing the loss, theft, or misplacement of a cell phone.

FIG. 2 is a block diagram of a security system according to an embodiment of this invention for preventing the loss, misplacement, or theft of cell phone 3. As illustrated, cell phone 3 includes wireless digital or analog transmitter 17 for voice and/or DTMF communication via antenna 18 with cell phone network 5, wireless digital or analog cell phone receiver 19 for receiving voice signals from network 5, cell phone battery and controller 20, alarm 22, modulator/demodulator and signal processor 24, RF or microwave transmitter 26 for sending low power analog RF or microwave security signals directly to security signal receiver 28 in pager 29, RF or microwave receiver 30 for receiving signals directly from the pager, and finally cell phone housing 31. The RF or microwave transmitter 26 and receiver 30 within cell phone 3 communicate in a wireless manner with pager 29 (or other similar device) by way of antenna member 33 that is built into and does not protrude from the housing of the cell phone. In other words, unlike antenna member 18 for voice and/or DTMF communication with network 5, antenna 33 does not extend outwardly of the phone, but instead is built thereinto due to the short range of security signal transmission/reception required. It is noted that the same cell phone battery 20 that supplies power to cell phone voice and DTMF transmitter 17, receiver 19, cell phone signal modulator/demodulator 24, and controller is also used to supply power to the security devices 22, 26, and 30 contained within phone 3 for the purpose of preventing loss, theft or misplacement. Accordingly, no additional battery or power source is needed for the loss prevention or security system provided in the phone.

Figure 3:
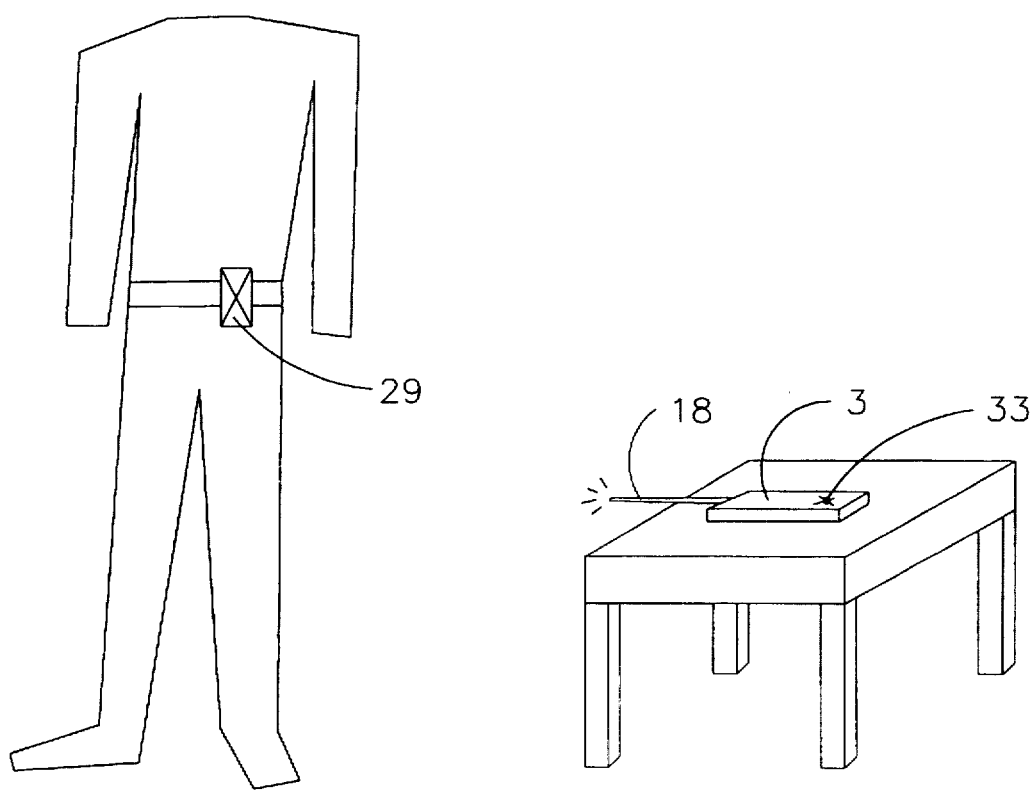
FIG. 3 is a perspective view of a user in close proximity to his/her cell phone, wherein the wireless transmission between the device worn by the user (e.g. pager) and the cell phone sounds an alarm upon loss or misplacement of the phone.

Pager device 29, with whom cell phone 3 communicates, is adapted to be mounted on the user's body as shown in FIG. 3. Referring again to FIG. 2, pager 29 has conventional pager technology including LCD display 35 for displaying the number or identification of a calling party and indicating reception of a signal, receiver 37 for receiving wireless paging signals via antenna 38, battery 39 for supplying power to the mechanisms within the pager, pager circuitry 40, pager control 41, and optical, vibratory, or audible alert 42 for indicating to the user when a page has been received. In addition to this conventional pager technology, pager 29 further includes an RF or microwave transmitter 43 for sending wireless signals to cell phone 3, RF or microwave receiver 28 for receiving low power security signals from cell phone transmitter 26, and wireless antenna system 45 for transmitting/receiving signals from antenna system 33 of cell phone 3. In addition to performing conventional functions, pager controller 41 and circuitry 40 control and implement the operations of receiver 28, and transmitter 43. Furthermore, battery 39 supplies power not only to the conventional paging features of pager 29, but also to the devices associated with the security system such as receiver 28, transmitter 43, antenna system 45, display 35, alert/alarm 42, and the additional circuitry required within 40 and 41. Accordingly, a second power source is not required for the implementation of the security aspect of this invention thereby improving the efficiency of the system.

Alert/alarm 42 within pager 29 is commanded to sound or otherwise be actuated (e.g. beeping, vibrating, or making some other audible or optical signal) when controller 41 and/or circuitry 40 has determined that cell phone 3 has either (i) not sent a low power signal which was actually received by the pager for a predetermined period of time; or (ii) sent a low power signal that was received by the pager, and was determined to be so weak that the cell phone is determined to be positioned a distance away from pager 29 that exceeds a predetermined distance threshold. In either event, alert 42 is actuated to alert the user that cell phone 3 has been misplaced, stolen, or lost. According to additional embodiments of this invention, when either one or both of the two above-listed events is determined to have occurred, transmitter 43 within pager 29 sends an RF or microwave signal to cell phone 3 via antenna system 45 that is received by receiver 30, this signal causing cell phone controller 20 to actuate phone alarm 22 which beeps, vibrates, or makes some other type of audible or optical signal which may deter theft of the cell phone or help the user locate the phone in darkness, or some other type of unfamiliar environment.

According to certain embodiments of this invention, the security system works as follows. Controller 20 within cell phone 3 causes transmitter 26 to emit a low power short-range RF or microwave signal via antenna 33 to pager 29 intermittently on a continual basis. For example, transmitter 26 may be caused by controller 20 to send an RF signal having a predetermined low strength to pager 29 every ten seconds. This intermittent time frame may range anywhere between about one second and thirty seconds according to certain embodiments of this invention. The pager receives such intermittent signals sent by the cell phone by way of antenna system 45. From antenna system 45, the received low power signals make their way to receiver 28 and thereafter into pager processing and receiver circuitry 40. Together, controller 41 and processor/circuitry 40 determine both the strength (e.g. amplitude) of the signal received from the cell phone and the point in time when the last such signal was received (i.e. a timer is provided within circuitry 40 for determining how long it has been since a security signal having a predetermined strength was last received from the cell phone transmitter 26). When it is determined within pager 29 in certain embodiments of this invention that an appropriate signal of sufficient power or amplitude has not been received from the cell phone for a predetermined period of time (e.g. from about five seconds to five minutes), then controller 41 causes pager alarm or alert 42 to be actuated indicating to the user that the cell phone has either been misplaced, lost, forgotten, or stolen. Additionally, according to certain embodiments, when controller 41 and processing circuitry 40 determine (e.g. via an appropriate filter) that the strength of the signal received from cell phone 3 has dropped below a predetermined power or amplitude threshold, alarm 42 is actuated to alert the user as to the possibilities recited above. According to certain other embodiments, alarm 42 is not actuated based upon a low strength signal being received until a predetermined number of low strength signals (i.e. below a predetermined threshold) are, in fact, received and detected to have been below the strength threshold. For example, alarm 42 may only be actuated according to certain embodiments upon pager 29 receiving at least between about two and ten consecutive signals in a row that have a strength or strengths (including zero) below the predetermined strength threshold. At the same time as, or after, alarm 42 has been actuated within the pager to alert to user of misplacement, theft, or the like, controller 41 by way of processing circuitry 40 causes RF or microwave transmitter 43 to emit a wireless signal via antenna system 45 to the cell phone. This signal, received by antenna system 33 and receiver 30, results in controller 20 of the cell phone causing alarm 22 to be actuated as a theft deterring or locating signal. For example, alarm 22 may emit a loud beeping sound such as those found in car alarms, and/or an optical signal so as to help the user find the cell phone in dark environments. Alerts/alarms 42 and 22 may sound either for (i) a predetermined period of time (one minute); (ii) until either of the signals transmitted from the cell phone that are received by pager 29 have a strength above the predetermined threshold; or (iii) the user actuates manual switch 51 attached to the pager housing that causes control 41 to stop actuation of both alarm 42 and alarm 22 by sending a signal to the cell phone.

FIG. 3 is a perspective view illustrating the operator wearing pager 29 on his belt in proximity to cell phone 3 that includes both cellular antenna voice and DTMF system 18 which extends from the phone housing and RF or microwave security antenna system 33 that is built into the cell phone housing. When the cell phone remains in proximity (e.g. within about 50 feet) of pager 29 as shown in FIG. 3, neither alarm 22 nor alarm 42 will be actuated. It is only upon, for example, the user leaving the room within which cell phone 3 is located that the low power signal sent from cell phone transmitter 26 to the pager will either no longer be received by the pager or will be at a received strength below the threshold, that will result in one or both of the alarms being actuated.

According to certain alternative embodiments of this invention, the continuous intermittent transmitter may be positioned within the pager instead of the cell phone, with the receiver for receiving the intermittent RF or microwave signal being located in the cell phone. In such embodiments, the alarm 42 may be located still in the pager.

Once given the above disclosure, therefore, various other modifications, features, and/or improvements will become apparent to the skilled artisan. Such other features, modifications, and improvements are thus considered a part of this invention, the scope of which is to be determined by the following claims.

I claim:

1. A system for reducing the risk of loss or theft of a cellular telephone, the system comprising:
a cellular telephone including: (a) a cell phone battery, (b) a wireless cell phone transmitter for voice and DTMF communication with distant phones, pagers, and/or computers via a cellular telephone network, (c) a demodulator for demodulating incoming voice signals; and (d) a security wireless transmitter for sending wireless security signals to a device to be worn or carried by the user, said cell phone battery supplying power to each of said cell phone transmitter, said demodulator, and said security transmitter;

said device to be worn or carried by the user including (i) a battery, (ii) an alarm, (iii) a security controller, and (iv) a first wireless receiver for receiving said wireless security signals sent from said security transmitter of said cellular phone, said battery in said device to be worn or carried by the user supplying power to said security controller, said alarm, and said first receiver;

wherein said security controller in said device to be worn or carried by the user includes means for actuating said alarm in response to one of: (i) the wireless security signal received by said first receiver from said cell phone being of a strength or amplitude below or equal to a predetermined threshold; and (ii) no wireless security signal above the predetermined threshold being received by said first receiver from said cell phone for a predetermined period of time, whereby the user is alerted to cell phone misplacement, loss, or theft by actuation of said alarm;

wherein said device to be worn or carried by the user includes a pager for receiving wireless paging message signals from a telephone system indicative of a calling party's number, said pager further including (v) a second wireless paging receiver for receiving said paging message signals, said second receiver being powered by said battery in said device and being separate and distinct from said first receiver; and (vi) a display for displaying data relating to received paging messages, said display also being powered by said battery in said device.

2. The system of claim 1, wherein said security wireless transmitter intermittently transmits said security signals to said first receiver.

3. The system of claim 2, wherein said cell phone further includes an alarm and means for actuating said cell phone alarm when a signal from said device is received indicative of potential loss, theft, or misplacement of said cell phone.

4. The system of claim 1, wherein said device to be worn or carried by the user further includes a responsive transmitter for sending alarm signals to said phone in response to one of: (i) the wireless security signal received by said first receiver from said cell phone being of a strength or amplitude below or equal to a predetermined threshold; and (ii) no wireless security signal above the predetermined threshold being received by said first receiver from said cell phone for a predetermined period of time.

5. The system of claim 4, wherein said cellular telephone further includes an alarm which is actuated in response to receipt of said signals from said responsive transmitter of said device to be worn or carried by the user, said alarm in said phone outputting one of an audible alarm signal, an optical alarm signal, and a vibrating alarm signal.

6. A method of reducing the risk of loss or theft of a cellular telephone, the method comprising the steps of:
providing a cellular phone including a cell phone battery, a wireless cell phone transmitter for voice and DTMF communication with distant phones, pagers, and/or computers via a cellular telephone network, a demodulator for demodulating incoming voice signals, and a security wireless transmitter for sending wireless security signals to a device to be worn or carried by the user;

providing said device to be worn or carried by the user, said device including a battery, an alarm, a security controller, and a first wireless receiver for receiving wireless security signals sent from said security transmitter of said cellular telephone, said battery in said device to be worn or carried by the user supplying power to said security controller, said alarm and said first receiver;

determining when said first wireless receiver in said device receives a security signal from said cellular telephone having a power or amplitude level below a predetermined threshold;

actuating an alarm in said device when it is determined that said security signal receives from said cell phone is below said threshold; and wherein said device to be worn or carried by the user includes a pager for receiving wireless paging message signals from a telephone system indicative of a calling party.

7. A system for reducing the risk of loss or theft of an electronic device, the system comprising:

the electronic device including: (a) a battery; (b) a wireless transmitter for communication with distant phones, pagers, and/or computers via a network; (c) a demodulator for demodulating incoming signals; and (d) a security wireless transmitter for sending wireless security signals to a device to be worn or carried by a user, the battery supplying power to each of the transmitter, the demodulator, and the security transmitter;

said device to be worn or carried by the user including: (i) a battery; (ii) an alarm; (iii) a security controller; and (iv) a first wireless receiver for receiving said wireless security signals sent from said security transmitter of: said electronic device, said battery in said device to be worn or carried by the user supplying power to said security controller, said alarm, and said first receiver;

wherein said security controller in said device to be worn or carried by the user includes means for actuating said alarm in response to one of: (i) the wireless security signal received by the first receiver from the electronic device being of a strength or amplitude below or equal to a predetermined threshold; and (ii) no wireless security signal above the predetermined threshold being received by said first receiver from said electronic device for a predetermined period of time, whereby the user is alerted to misplacement, loss, or theft of the electronic device by actuation of said alarm; and wherein said device to be worn or carried by the user includes a pager for receiving wireless paging message signals from a telephone system indicative of a calling party's number, said pager further including a second wireless paging receiver for receiving said paging message signals, said second receiver being powered by said battery in said pager; and a display for displaying data relating to received paging messages, said display also being powered by said battery in said pager.

* * * * *